United States Patent
McPheeters (10) Patent No.: US 10,094,596 B2
(45) Date of Patent: Oct. 9, 2018

(54) RACKING ASSEMBLIES FOR SOLAR PANEL INSTALLATIONS

(71) Applicant: Sunrun South LLC, San Francisco, CA (US)

(72) Inventor: Greg McPheeters, Santa Clara, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 14/510,884

(22) Filed: Oct. 9, 2014

(65) Prior Publication Data
US 2015/0020874 A1 Jan. 22, 2015

Related U.S. Application Data

(63) Continuation of application No. 13/451,482, filed on Apr. 19, 2012, now Pat. No. 9,022,021.

(60) Provisional application No. 61/477,081, filed on Apr. 19, 2011.

(51) Int. Cl.
  *F24S 25/65* (2018.01)
  *F24S 25/13* (2018.01)
  *F24J 2/52* (2006.01)
  *H02S 20/00* (2014.01)

(52) U.S. Cl.
  CPC .............. *F24S 25/65* (2018.05); *F24J 2/525* (2013.01); *F24J 2/526* (2013.01); *F24J 2/5232* (2013.01); *F24S 25/13* (2018.05); *H02S 20/00* (2013.01); *Y02B 10/20* (2013.01); *Y02E 10/47* (2013.01)

(58) Field of Classification Search
  CPC .. F24J 2/523; F24J 2/5232; E04B 1/18; E04B 1/19; E04B 1/185; E04B 1/1903
  USPC .............. 126/696; 52/48, 478, 579
  See application file for complete search history.

(56) References Cited

U.S. PATENT DOCUMENTS

| | | | | |
|---|---|---|---|---|
| 2,346,200 A | * | 4/1944 | Tinnerman | 411/166 |
| 3,140,885 A | * | 7/1964 | Bastis et al. | 403/363 |
| 3,444,664 A | * | 5/1969 | Fink, Jr. et al. | 52/840 |
| 3,606,418 A | * | 9/1971 | Buker et al. | 403/363 |
| 3,701,613 A | * | 10/1972 | Turner | E04B 1/5818 403/387 |
| 4,342,177 A | * | 8/1982 | Smith | E04B 1/24 403/188 |
| 4,365,453 A | * | 12/1982 | Lowe | E04B 1/08 52/478 |
| 4,490,958 A | * | 1/1985 | Lowe | 52/634 |
| 4,602,468 A | * | 7/1986 | Simpson | 52/410 |

(Continued)

FOREIGN PATENT DOCUMENTS

JP 2004324364 A * 11/2004

OTHER PUBLICATIONS

U.S. Appl. No. 61/541,985, filed Sep. 30, 2011.
U.S. Appl. No. 61/586,648, filed Jan. 13, 2012.

*Primary Examiner* — Jorge Pereiro
(74) *Attorney, Agent, or Firm* — Kramer Levin Naftalis & Frankel LLP (57) ABSTRACT

Racking assemblies for solar panel installations are provided. The racking assemblies may include a series of posts arranged in two parallel rows and anchored to the ground or other suitable surface. Purlins may be coupled to and may span the posts of each row. Specialized clamps may be used to attach the purlins to a series of mounting rails. The mounting rails, in turn, may support an array of solar modules.

19 Claims, 12 Drawing Sheets

(56) References Cited

U.S. PATENT DOCUMENTS

| | | | | |
|---|---|---|---|---|
| 4,656,794 A * | 4/1987 | Thevenin | | E04B 1/5818 52/22 |
| 4,796,391 A * | 1/1989 | Lu | | E04B 1/3408 52/11 |
| 4,966,631 A * | 10/1990 | Matlin et al. | | 136/244 |
| 5,038,529 A * | 8/1991 | Conley et al. | | 52/14 |
| 5,079,884 A * | 1/1992 | Menchetti | | 52/241 |
| 5,125,608 A * | 6/1992 | McMaster et al. | | 248/163.1 |
| 5,143,556 A * | 9/1992 | Matlin | | 136/244 |
| 5,185,972 A * | 2/1993 | Markiewicz | | E04H 15/58 135/121 |
| 5,797,573 A * | 8/1998 | Nasu | | 248/231.31 |
| 6,240,682 B1 | 6/2001 | James et al. | | 52/90.2 |
| 6,345,484 B1 * | 2/2002 | Oliver | | E04B 1/34336 52/223.11 |
| 6,470,644 B2 * | 10/2002 | James et al. | | 52/745.06 |
| 7,900,417 B1 * | 3/2011 | Leines | | E04C 3/06 52/650.3 |
| 7,918,054 B2 * | 4/2011 | Grafton et al. | | 52/92.3 |
| 8,250,829 B2 * | 8/2012 | McPheeters et al. | | 52/710 |
| 8,468,755 B2 * | 6/2013 | Zuritis | | 52/173.3 |
| 8,511,007 B2 * | 8/2013 | Powers, III | | 52/173.3 |
| 8,550,419 B2 * | 10/2013 | Hausner et al. | | 248/370 |
| 8,640,420 B1 * | 2/2014 | Halley | | E04F 10/08 52/650.1 |
| 9,022,021 B2 | 5/2015 | McPheeters | | |
| 2001/0025458 A1 * | 10/2001 | James et al. | | 52/90.2 |
| 2008/0236571 A1 * | 10/2008 | Keshner et al. | | 126/623 |
| 2008/0290233 A1 * | 11/2008 | McCoubrie | | 248/228.7 |
| 2009/0007520 A1 * | 1/2009 | Navon | | E04B 7/022 52/837 |
| 2009/0065038 A1 * | 3/2009 | Freyman et al. | | 135/116 |
| 2009/0211177 A1 * | 8/2009 | Grafton et al. | | 52/93.1 |
| 2010/0065108 A1 * | 3/2010 | West | | F24J 2/5211 136/251 |
| 2010/0132769 A1 * | 6/2010 | Potter et al. | | 136/251 |
| 2010/0163015 A1 * | 7/2010 | Potter et al. | | 126/600 |
| 2010/0281793 A1 | 11/2010 | McPheeters et al. | | |
| 2010/0282920 A1 | 11/2010 | McPheeters | | |
| 2011/0067749 A1 * | 3/2011 | Zuritis | | F24J 2/4607 136/246 |
| 2011/0094088 A1 * | 4/2011 | Potter et al. | | 29/592.1 |
| 2011/0094559 A1 * | 4/2011 | Potter et al. | | 136/244 |
| 2011/0126881 A1 * | 6/2011 | Hong | | F24J 2/5205 136/244 |
| 2011/0272367 A1 * | 11/2011 | Kufner | | 211/41.1 |
| 2011/0277402 A1 * | 11/2011 | Schnitzer | | 52/173.3 |
| 2012/0031456 A1 * | 2/2012 | Christman | | H02S 20/00 136/244 |
| 2012/0073219 A1 * | 3/2012 | Zuritis | | 52/173.3 |
| 2012/0085394 A1 | 4/2012 | McPheeters et al. | | |
| 2012/0227791 A1 * | 9/2012 | Vari | | H02S 20/00 136/251 |
| 2012/0267328 A1 | 10/2012 | McPheeters | | |
| 2012/0291374 A1 * | 11/2012 | Zante | | 52/173.3 |

* cited by examiner

RACKING ASSEMBLIES FOR SOLAR PANEL INSTALLATIONS

CROSS-REFERENCE TO RELATED APPLICATION

This application is a continuation of U.S. Pat. No. 9,022,021, issued on May 5, 2015, which claims the benefit of previously filed U.S. Provisional Patent Application No. 61/477,081, filed on Apr. 19, 2011, entitled "Racking Assembly for Solar Panel Installation," each of which is incorporated by reference herein in its entirety.

BACKGROUND

Photovoltaic solar panels, or solar modules, are an increasingly popular means of generating renewable power via the photovoltaic effect. Recently, there has been a wide proliferation of solar projects of all sizes, from small residential installations to large utility scale power production.

A significant cost associated with solar power projects arises from paying a trained installer to set up a racking assembly and attach solar panels to the assembly. Racking assemblies can support the solar panels at particular angles and heights above the ground. In addition, racking assemblies can provide support for various other solar installation components, including junction boxes and wiring. Typically, solar panels are attached to a racking assembly using a complicated multi-step process involving grounding conductors and clamps and/or bolts, which incurs significant labor and material cost. Reducing the number of components and labor required to install solar panels can drastically reduce installation costs.

As solar technology continues to grow in popularity there is a need to make the installation of solar panels easier, cheaper, and safer.

SUMMARY

Racking assemblies according to embodiments disclosed herein can include a number of posts anchored to the ground or any other suitable surface. The posts may be arranged in two rows, including a front row with relatively short posts and a back row including relatively tall posts. The posts of each row can be interconnected by one or more purlins, which can be securely fastened to the posts. In some embodiments, the purlins may be zee-purlins.

A series of mounting rails may be fastened to the purlins with purlin clamps or ground rail purlin clamps such that the mounting rails span from the front row to the back row. The purlin clamps and ground rail purlin clamps disclosed herein allow the mounting rails and solar modules to be installed at any desired tilt angle. In some embodiments, the mounting rails can extend beyond the purlins of one or both of the rows. Racking assemblies may also include several purlin braces, each of which may be attached between a purl in and a mounting rail to provide additional strength and support to the racking assembly.

Solar panels may be mounted on the mounting rails in any suitable fashion. In some embodiments, the racking assembly as disclosed herein may be used in conjunction with the Snap-in Mounting Systems for Laminate Solar Panels disclosed in U.S. Patent Application Publication. No. 2012/0085394, filed Oct. 6, 2011, which is incorporated herein in its entirety.

As used herein, a "cell" can refer to a single piece of crystalline silicon that is doped to generate electricity via the photoelectric effect. Cells may be any shape and size, but are typically round or square and range from 4" to 6" across. The terms "module" and "panel" can interchangeably refer to an assembly or array of cells. Modules may be mounted on a single substrate (e.g., glass) and electrically coupled to other modules (e.g., using wire leads). The term "laminate" can refer to a module or panel with no frame.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION

Figure 1:
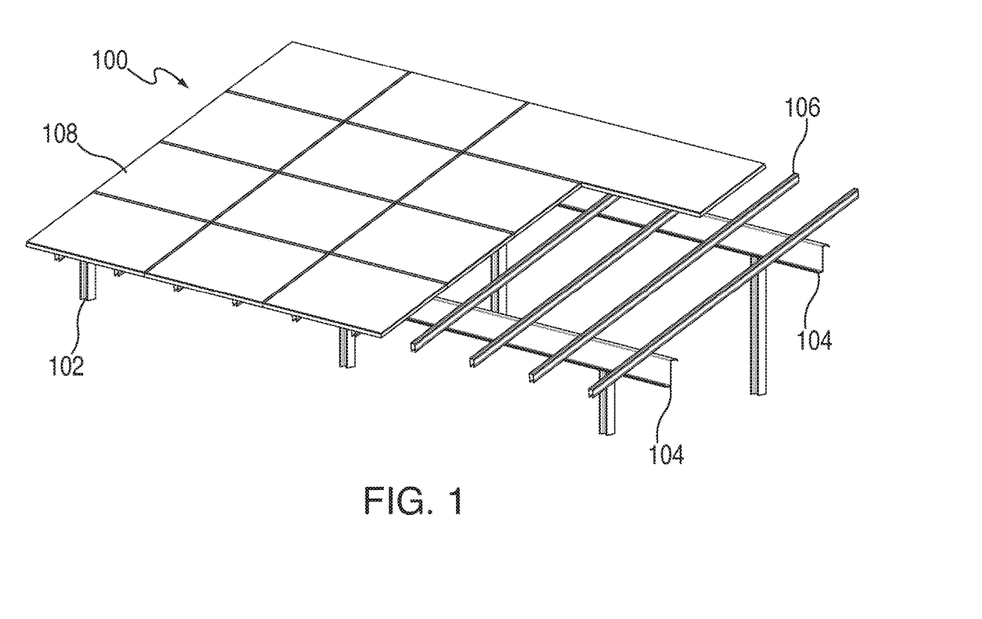
FIG. 1 is a perspective view of a racking assembly in accordance with some embodiments.

FIG. 1 is a perspective view of a racking assembly 100, which can include posts 102, purlins 104, mounting rails 106, and solar modules 108. Racking assembly 100 may be particularly suited for large-scale ground mount solar module installations. However, racking assembly 100 may also be used for smaller residential systems and may be installed on rooftops or in any other suitable location.

Posts 102 may be configured to be used with any suitable foundation 110, which may allow racking assembly 100 to be installed on virtually any installation site. Various foundation options are discussed in detail below with respect to FIGS. 10-12.

Posts 102 may be arranged in two parallel rows with the posts in the front row being shorter than the posts in the back row in order to facilitate mounting solar modules 108 at an angle. The optimal tilt angle for a racking assembly may depend on a number of factors including latitude and environmental conditions (e.g., wind and seismic activity) at the installation site. Available space for the installation may also put constraints on the tilt angle. For example, steeper tilt angles may increase self-shading between adjacent racking assemblies, so for installations in which space is constrained, tilt angles may be lowered from their otherwise optimal levels.

Purlins 104 can span between posts 102 in the same row. That is, posts 102 of each row can be interconnected by one or more purlins 104, which may be securely fastened to the posts. According to some embodiments, purlins 104 may be roll form zee-purlins. Zee-purlins may be point symmetric structures that may include a flat middle section and two flanges extending perpendicularly away from the middle section.

Figure 12:
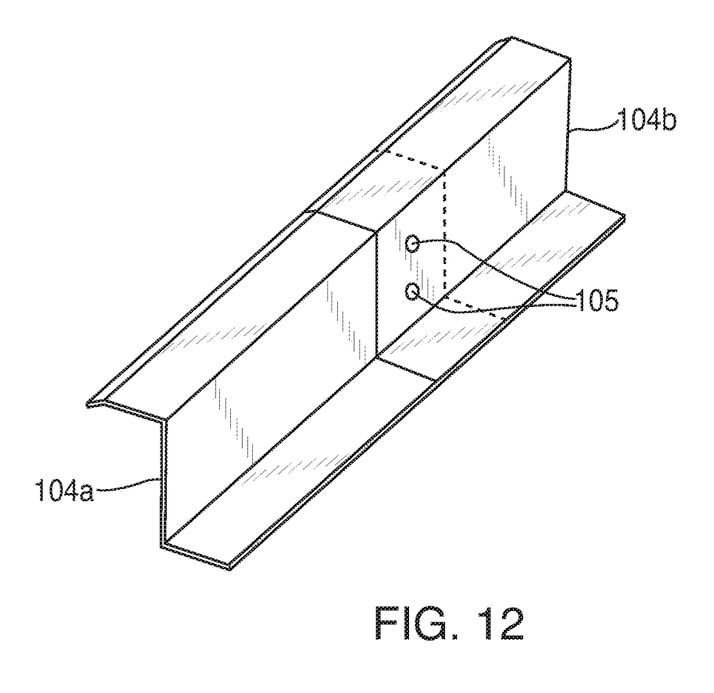
FIG. 12 is a perspective view of partially overlapping purlins in a nesting configuration, spliced together with at least one fastener in accordance with some embodiments.

Depending on the overall size of racking assembly 100, purlins 104 may be any suitable length. For example, a single purlin 104 may span the entirety of racking assembly 100. However, in most embodiments, several purlins 104 can be spliced at any point along their lengths with any suitable overlap, such as approximately 61 cm (24 in.), for example, such that any sized racking assembly may be readily constructed with standard-order purlins. Overlapping purlins may be nested and coupled together with any suitable fasteners (e.g., TEK screws). Overlapping, nested purlins are shown in FIG. 12, in which purlins 104a and 104b are coupled together with fasteners 105. Furthermore, purlins 104 may be coupled to posts 102 with any suitable hardware. For example, purlins 104 may be attached to posts 102 with screws (e.g., TEK screws), bolts, rivets, pins, and/or any other suitable fasteners.

A series of mounting rails 106 may be coupled to purlins 104 and span from purlins 104 in the front row to purlins 104 in the back row of racking assembly 100. In some embodiments, mounting rails 106 may be centered on purlins 104, such that the front-row overhang is equal to the back-row overhang. In other embodiments, mounting rails 106 may be mounted off-center to purlins 104 in order to adjust for environmental factors, including self-shading between adjacent assemblies and typical stresses from wind and seismic activity.

To complete racking assembly 100, an array of solar modules 108 may be coupled to mounting rails 106.

Figure 2:
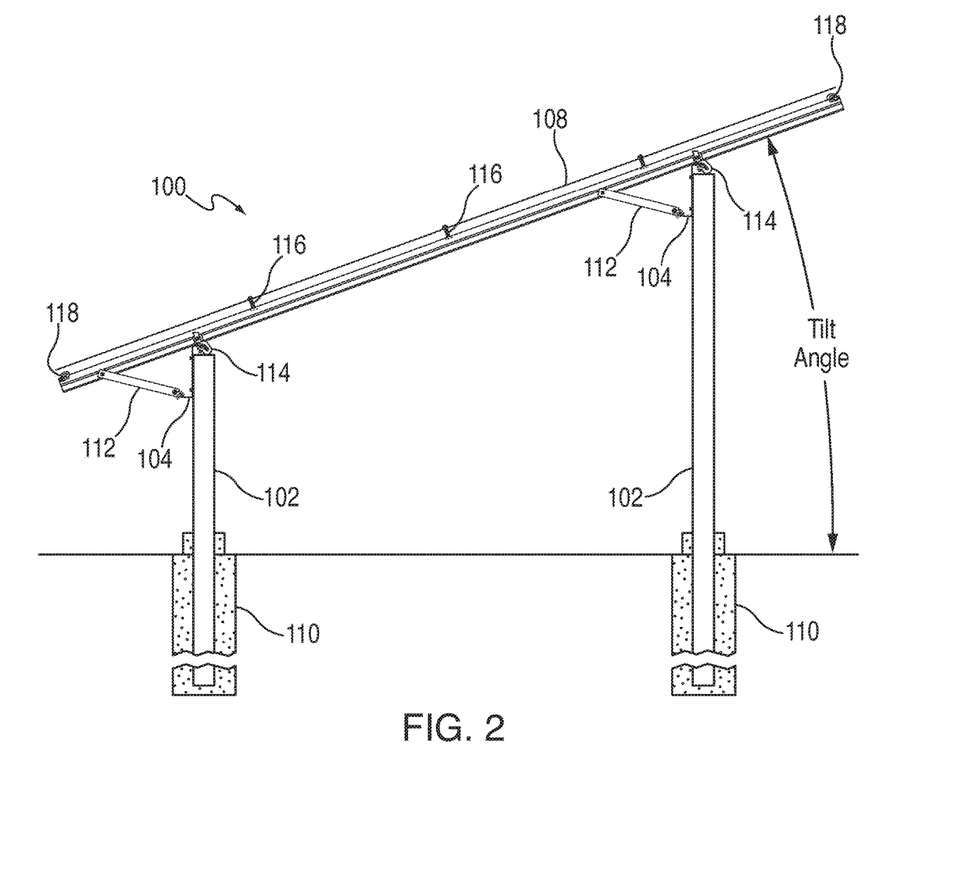
FIG. 2 is a cross-sectional view of the racking assembly of FIG. 1 in accordance with some embodiments.

FIG. 2 is a cross-sectional view of racking assembly 100 of FIG. 1. In this embodiment, posts 102 are set within concrete piers 110; however, as discussed above with respect to FIG. 1, posts 102 may be set within any suitable foundation (e.g., soil, grade beams, and/or ballast blocks).

Purlin braces 112 may be coupled between lower flanges of purlins 104 and one or more mounting rails 106 to prevent twisting of racking assembly 100 under load. Incorporation of purlin braces 112 serves to reinforce purlins 104 and may allow for longer spans (i.e. longer lengths between consecutive posts 102), which may reduce the amount of hardware and the number of posts required for a given installation. In some embodiments, one purlin brace can be attached mid-span, or as close as possible to mid-span, between consecutive posts 102 of racking assembly 100. Purlin braces 112 may be coupled to purlins 104 and mounting rails 106 with any suitable fasteners, including screws, bolts, rivets, pins, and/or any other suitable fasteners. In some embodiments, purlin braces 112 may be fastened to channels of mounting rails 106 with a bolt and a channel nut. Purlin braces 112 may be formed from any suitable material (e.g., steel or aluminum).

Mounting rails 106 may be coupled to purlins 104 and/or posts 102 with suitable purlin clamps 114. Purlin clamps will be discussed in more detail with respect to FIGS. 3 and 4 below.

Solar modules 108 may be coupled to mounting rails 106 using suitable mounting hardware. For example, a row of solar modules 108 may be fastened to mounting rails 106 with two end clamps 118, one at each end of each mounting rail 106, and several mid clamps 116 along the length of each mounting rail 106.

Details of various end clamps and mid clamps that may be used in accordance with embodiments disclosed herein are disclosed in: U.S. Patent Application Publication No. 2010/0282920, filed May 22, 2009, entitled "Universal End Clamp;" U.S. Patent Application Publication No. 2010/0281793, filed May 22, 2009, entitled "Module Attachment Apparatus and Method;" U.S. Patent Ser. No. 61/541,985, filed Sep. 30, 2011, entitled "Wind Tunnel Optimized Solar Panel System;" and U.S. Patent Ser. No. 61/586,648, filed Jan. 13, 2012, entitled "Wind Tunnel Optimized Solar Panel System." Each of these references is incorporated herein in its entirety.

Figure 3A:
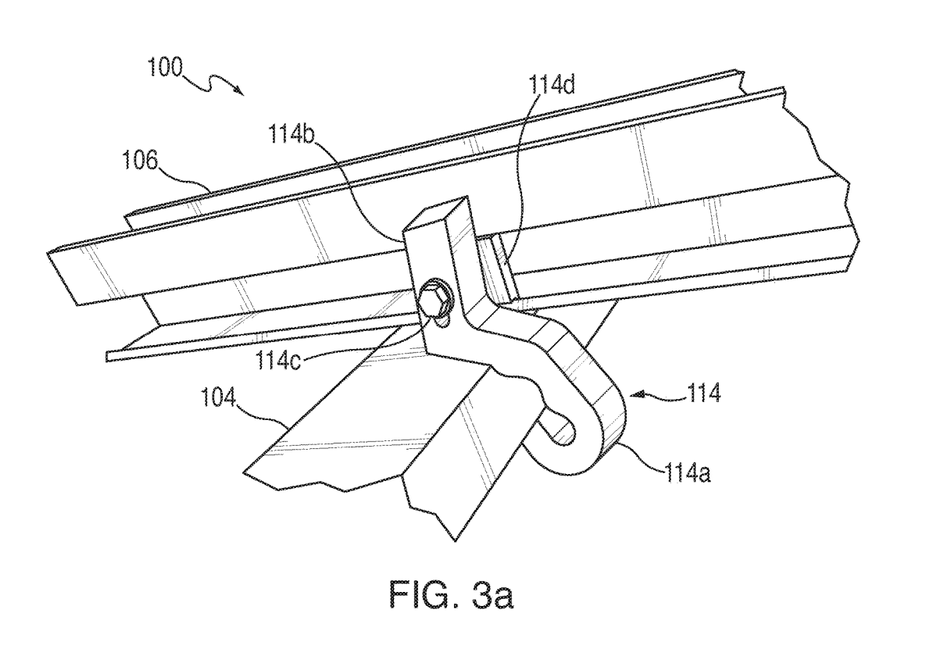
FIGS. 3a-3c are detailed perspective views of racking assemblies in accordance with some embodiments.

FIG. 3a is a detailed. perspective view of racking assembly 100 including purlin 104 coupled to mounting rail 106 with purlin clamp 114. Purlin clamp 114 can include a hook portion 114a that may be configured to engage an upper flange of purlin 104, and an arm portion 114b that may be coupled to mounting rail 106 with one or more suitable fasteners. As shown, purlin clamp 114 may be coupled to a channel of a standard mounting rail using a bolt 114c and a channel nut 114d. Similarly, purlin braces (not shown) may also be coupled to mounting rails 106 using a bolt and a channel nut. In these embodiments, mounting rails 106 and solar modules 108 may be mounted at any tilt angle ranging from 0 to about 90 degrees.

Figure 3B:
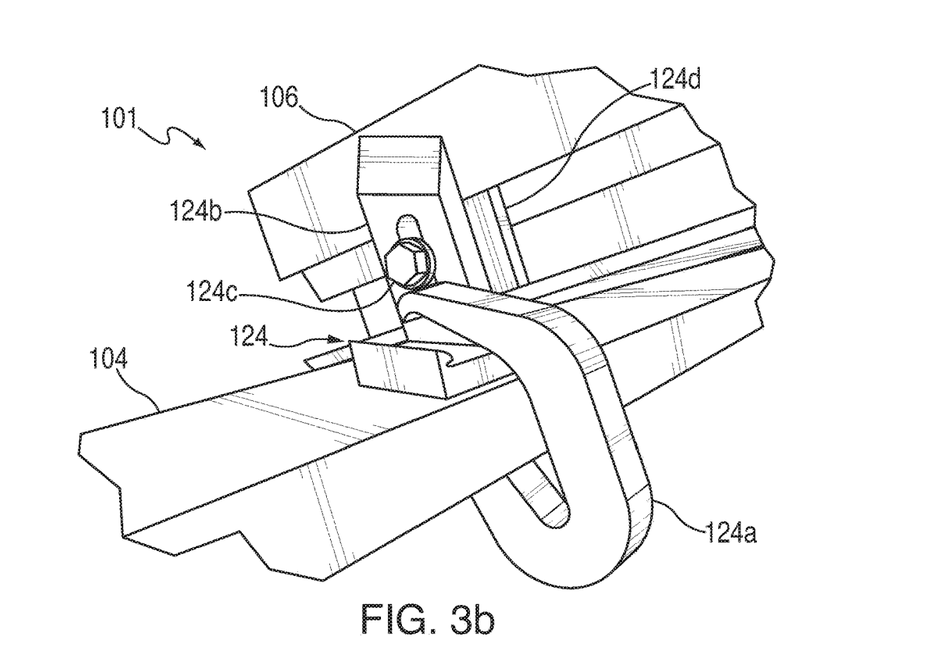

FIG. 3b is a detailed perspective view of racking assembly 100 including purlin 104 coupled to mounting rail 106 with a disassembled two-piece purlin clamp 124. Two-piece purlin clamp 124 can include a hook member 124a that may be configured to engage an upper flange of purlin 104, and an arm member 124b that may be coupled to mounting rail 106 with one or more suitable fasteners. As shown, purlin clamp 124 may be coupled to a channel of a standard mounting rail, using a bolt 124c and a channel nut 124d. Hook member 12a and arm member 124b may correspond to, for example, hook portion 114a and arm portion 114b of FIG. 3a.

Figure 3C:
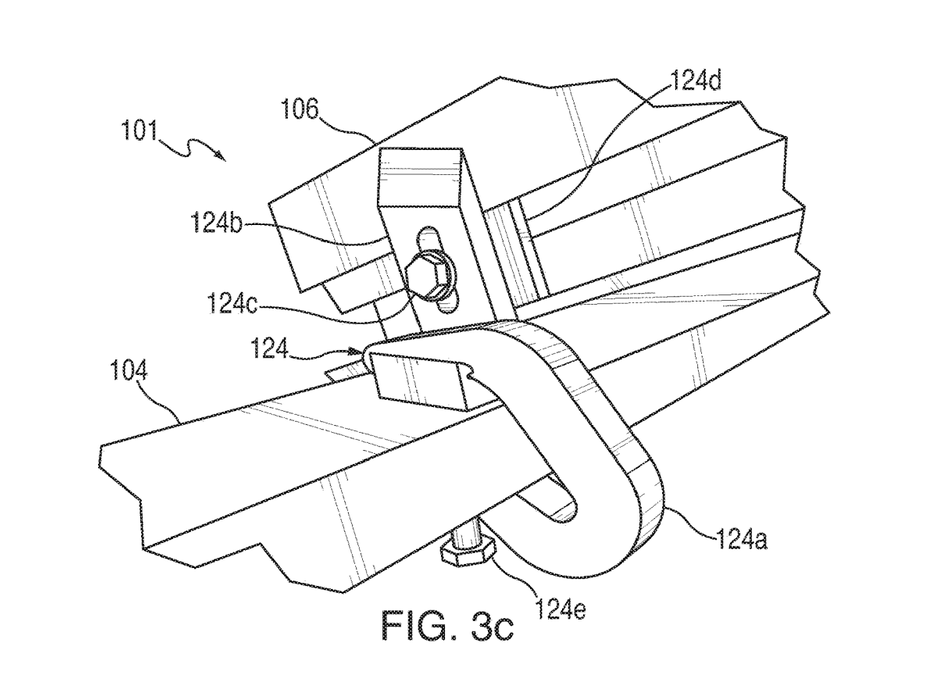

FIG. 3c is a detailed perspective view of racking assembly 100 including purlin 104 coupled to mounting rail 106 with an assembled two-piece purlin clamp 124. Hook member 124a may be coupled to the upper flange of purlin 104 with a purlin clamp fastener 124e. In some embodiments, purlin clamp fastener 124e may be a bolt that extends through hook portion 124a and prevents purlin clamp 124 from disengaging from the upper flange of purlin 104.

Figure 4:
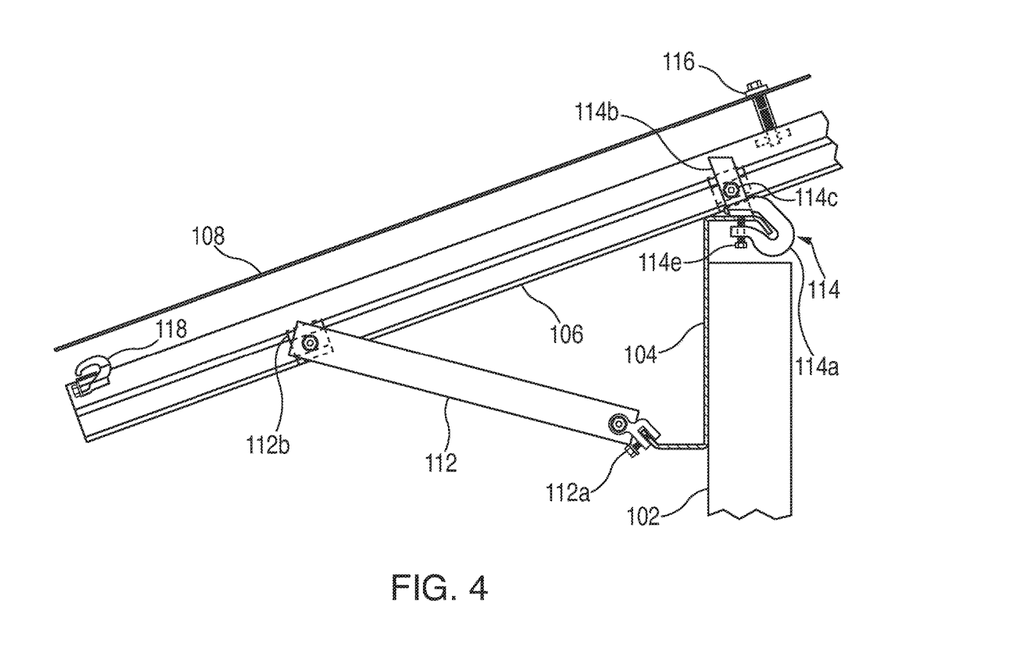
FIG. 4 is a detailed cross-sectional view of the racking assembly of FIGS. 1 and 2 in accordance with some embodiments.

FIG. 4 is a detailed cross-sectional view of racking assembly 100 including a post 102, a purlin 104, and a purlin clamp 114, which couples purlin 104 and post 102 to mounting rail 106 and solar modules 108. Hook portion 114a may be coupled to the upper flange of purlin 104 with a purlin clamp fastener 114e. In some embodiments, purlin clamp fastener 114e may be a bolt that extends through hook portion 114a and prevents purlin clamp 114 from disengaging from the upper flange of purlin 104. One skilled in the art will appreciate that two-piece purlin clamp 124 may be substituted for purlin clamp 114.

Purlin. brace 112 may be attached between a lower flange of purlin 104 and mounting rail 106. Purlin brace 112 may be coupled to purlin 104 with a purlin brace clamp 112a, which can be configured to engage the lower flange of purlin 104. Purlin brace clamp 112a may be secured with any suitable hardware such as, for example, a bolt, screw, and/or a rivet. Purlin brace 112 may be coupled to mounting rail 106 with a channel nut and bolt 112b, as depicted. In other embodiments, any suitable hardware may be used to couple purlin brace 112 to mounting rail 106.

Figure 5:
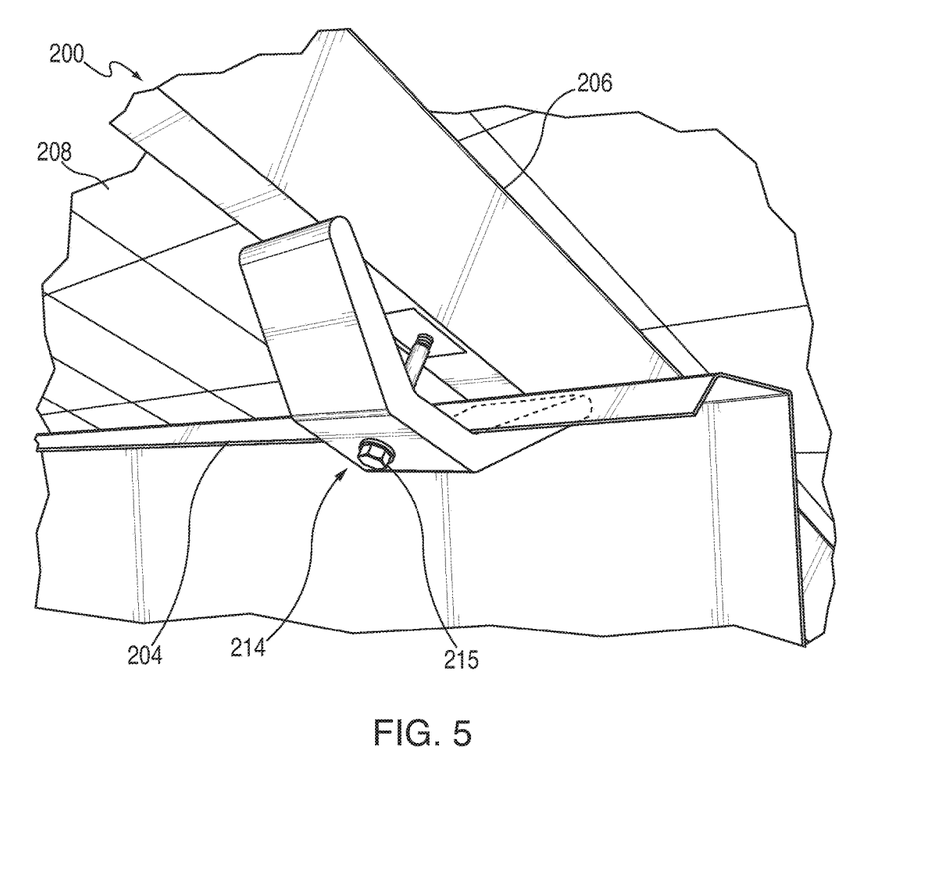
FIG. 5 is a detailed perspective view of another racking assembly in accordance with some embodiments.

FIG. 5 is a detailed perspective view of a racking assembly 200 including purlin 204 coupled to ground rail 206 with ground rail purlin clamp 214. Ground rail purlin clamp 214 may be crescent shaped in order to facilitate adjustment of the tilt angle of racking assembly 200. One end of ground rail purlin clamp 214 may be configured to engage an upper flange of purlin 204, and the other end of ground rail purlin clamp 214 can rest against, and provide support for, ground rail 206.

In some embodiments, ground rail 206 may be provided with a channel in the face closest to purlin 204. Ground rail purlin clamp 214 may be coupled to ground rail 206 using a bolt and a channel nut 215 configured to engage the channel of ground rail 206. Tightening the bolt while the channel, nut is engaged in the channel of ground rail 206 may pull ground rail 206 towards ground rail purlin clamp 214, thereby fastening ground rail 206 to purlin 204 and post 202. Thus, separate hardware may not be necessary to fixedly couple ground rail purlin clamp 214 to the upper flange of purlin 204. In other embodiments, ground rail purlin clamp 204 and purlin braces may be coupled to ground rail 206 using any suitable fasteners. Using ground rail purlin clamps 214, ground rails 206 and solar modules 208 may be mounted at any tilt angle ranging from 0 to about 90 degrees.

Figure 6:
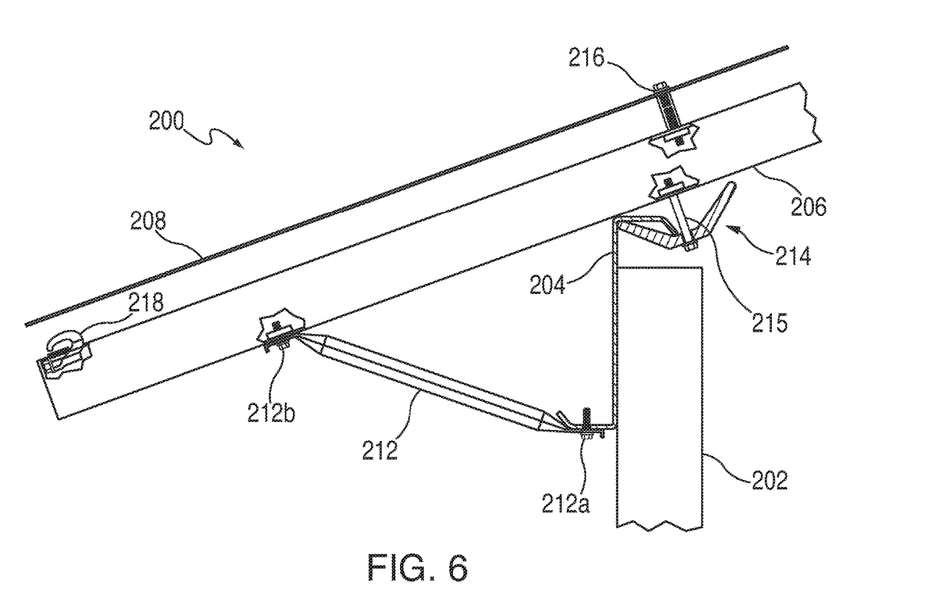
FIG. 6 is a detailed cross-sectional view of the racking assembly of FIG. 5 in accordance with some embodiments.

FIG. 6 is a detailed cross-sectional view of a racking assembly 200 that may include a post 202, a purlin 204, and a ground rail purlin clamp 214, which may couple purlin 204 and post 202 to ground rail 206 and solar modules 208. Purlin brace 212 may be attached between a lower flange of purlin 204 and ground rail 206. Purlin brace 212 may be coupled to purlin 204 with fastener 212a, which can be, according to various embodiments a TEK screw, bolt, or other suitable fastener. Purlin brace 212 may be coupled to ground rail 206 with a channel nut and bolt 212b, as depicted. In other embodiments, any suitable hardware may be used to couple purlin brace 212 to ground rail 206. Solar modules 208 may be coupled to ground rails 206 using suitable mounting hardware. For example, solar modules 208 may be fastened to ground rails 206 with one or more end clamps 218 and several mid clamps 216 along the length of each ground rail 206.

Figure 7:
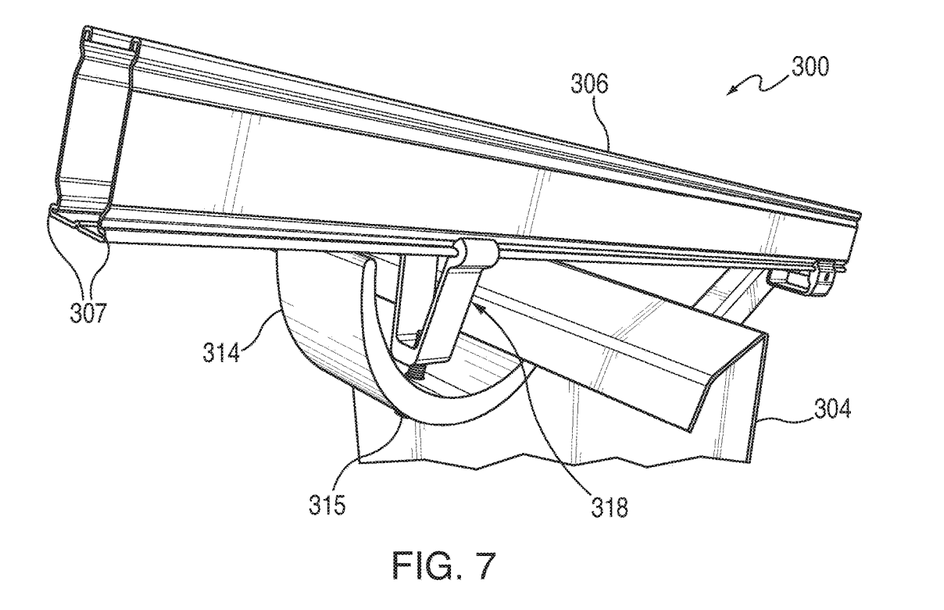
FIG. 7 is a detailed perspective view of yet another racking assembly in accordance with some embodiments.

FIG. 7 is a detailed perspective view of a racking assembly 300 including purlin 304 coupled to mounting rail 306 with purlin clamp 314 and rail clip 318. Purlin clamp 314 may be crescent shaped in order to facilitate adjustment of the tilt angle of racking assembly 300. One end of purlin clamp 314 may be configured to engage an upper flange of purlin 304, and the other end of purlin clamp 314 can rest against, and provide support for, mounting rail 306.

In some embodiments, mounting rail 306 may be provided with ridges 307 proximal to the face closest to purlin 304. Rail clip 318 may be formed from any suitable material (e.g., aluminum or steel) may be configured to clip onto ridges 307 of mounting rail 306 and receive bolt 315. Tightening bolt 315 while rail clip 318 is clipped onto ridges 307 of mounting rail 306 may pull mounting rail 306 towards purlin clamp 314, thereby fastening mounting rail 306 to purlin 304. Thus, separate hardware may not be necessary to fixedly couple purlin clamp 314 to the upper flange of purlin 304. In other embodiments, purlin clamp 304 and purlin braces (not shown) may be coupled to mounting rail 306 using any suitable fasteners. Mounting rail 306 may be, for example, roll formed steel or extruded aluminum rails. In some embodiments, mounting rail 306 may be formed from any suitable process capable of forming ridges 307.

Figure 8A:
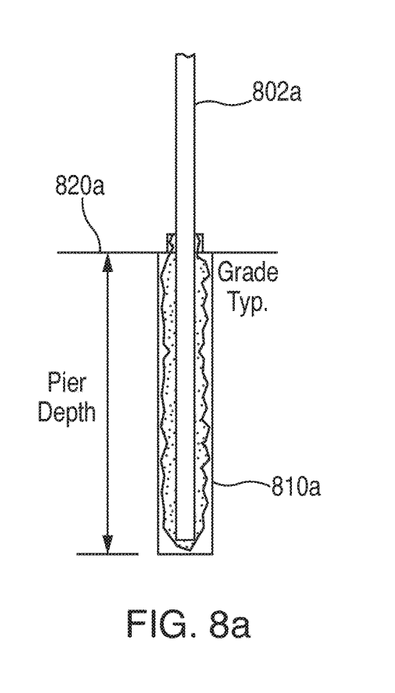
FIGS. 8a and 8b are cut-away views of a post set in a concrete pier in accordance with some embodiments.

FIG. 8a shows post 802a set into level ground 820a using a concrete pier 810a. In these embodiments, post 802a may be, for example, a 4"×4" posts or a cee-purlin set within a 12" diameter concrete pier. The cross-sectional dimensions of the concrete pier, the concrete pier depth, and the type of post used may depend on the grade type (e.g., whether the grade is flat or sloped), the concrete rating, and/or any other suitable factor including local zoning codes. In one example, if 4"×4" posts are used, they may require punched holes in at least one section in order to meet certain zoning requirements. Furthermore, the concrete pier may extend above the grade of the ground by including a concrete for (e.g., a Sonotube®) in the concrete pier surrounding the post in order to prevent water collection at the top of the concrete pier.

Figure 8B:
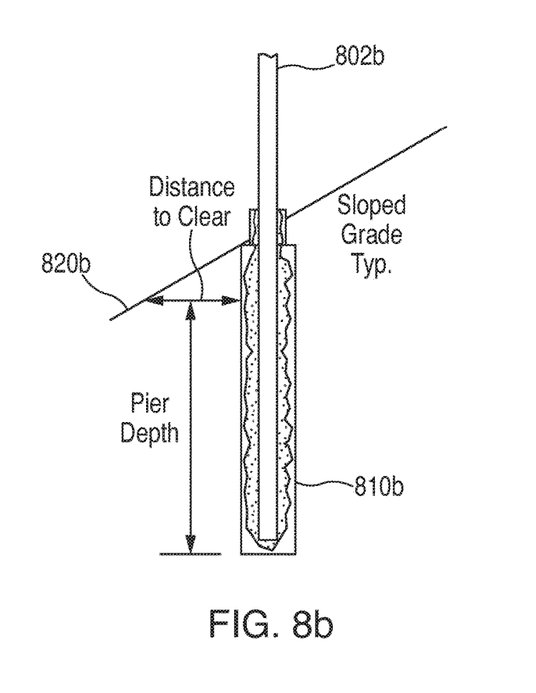

FIG. 8b shows post 802b set into sloped ground 820b using a concrete pier 810b. Installations on sloped ground may require a deeper pier than installations on flat ground to comply with zoning regulations and to ensure safety. The required pier depth may be measured from a level reference point downhill of the actual installation point. The reference point may be determined using 'distance to clear,' which measures the lateral distance between post 802b and sloped ground 820b downhill of post 802b. In some embodiments, the distance to clear may be, for example, 5 feet.

Figure 9A:
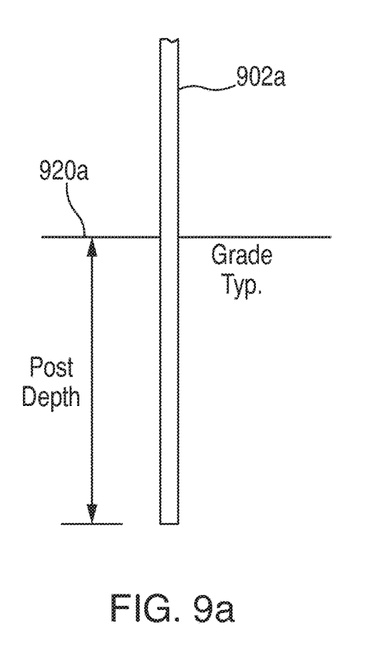
FIGS. 9a and 9b are cut-away views of a post set the ground in accordance with some embodiments.
Figure 9B:
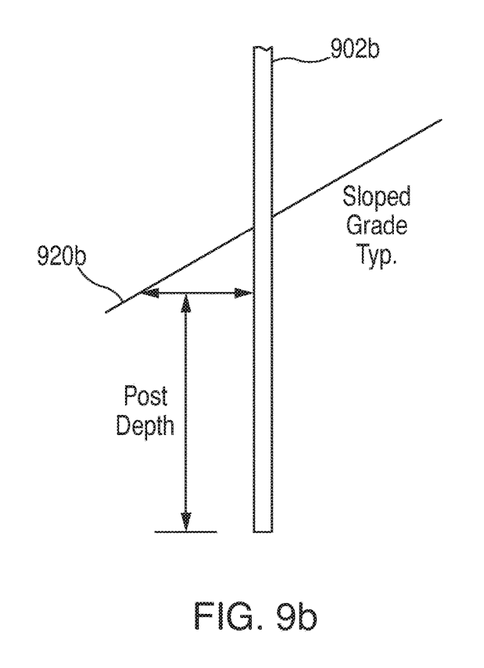

FIG. 9a shows post 902a driven directly into the flat ground 920a without being set in concrete piers. These embodiments may require a heavier post (e.g., a 6"×9" or larger post) because posts 902a may not be reinforced by concrete piers. The availability of using driven posts may depend on the soil conditions at the installation site. FIG. 9b shows post 902a driven directly into the sloped ground 920b without being set in concrete piers. As discussed above with respect to FIG. 8b, the required post depth may be measured from a level reference point downhill of the actual installation point. The level reference point may be determined using the distance to clear. In some embodiments, ground screws (e.g., Krinner Groundscrews) may be substituted for driven piles.

Figure 10:
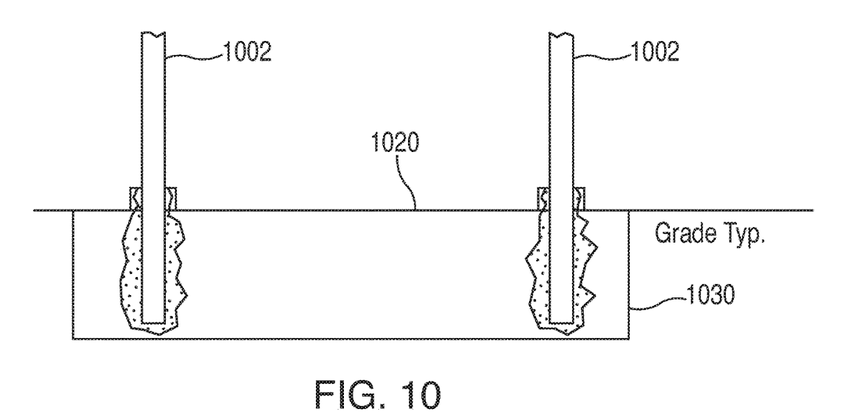
FIG. 10 is a cut-away view of posts set within a grade beam in accordance with some embodiments.

FIG. 10 shows posts 1002 set within a grade beam 1030a. Grade beam 1030a may be set at ground level and may distribute the weight of a racking assembly over a large area. Grade beams are particularly useful in areas where the soil conditions are not ideal. Grade beams may be formed from poured concrete and reinforced with re-bar. The length, width, and depth of the grade beams may be dependent on the local soil conditions and the dimensions of the racking assembly.

Figure 11:
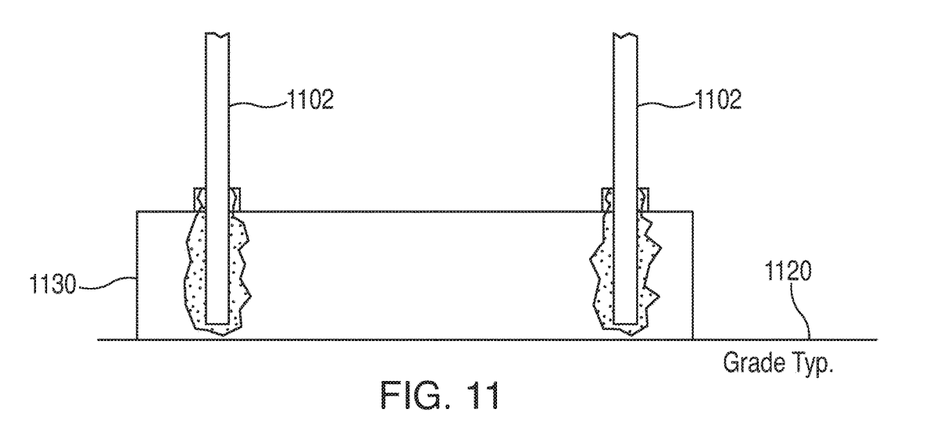
FIG. 11 is a cut-away view of posts set within a ballast block in accordance with some embodiments.

FIG. 11 shows posts 1102 set within a ballast block 1130a. Ballast block 1130a may be similar to grade beam 1030a, except that ballast block 1130a may rest upon the ground 1120 or other installation surface (e.g., a rooftop).

While there have been described racking assemblies for solar panel installations, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A solar panel racking assembly, comprising:
    a plurality of posts;
    a plurality of purlins coupled to the plurality of posts, each one of the at least one purlin of the plurality of purlins including a lower flange having horizontal and upwardly-bent edge portions with upper and lower surfaces;
    a plurality of rails coupled to the plurality of purlins; and
    a plurality of purlin braces, each one of the plurality of purlin braces having first and second ends, wherein the first end of at least one of the plurality of braces is configured with a clamp placed above and below the upper and lower surfaces, respectively, and wherein the first and second ends of at least one purlin brace of the plurality of purlin braces couple the upwardly-bent edge portion of the lower flange to a rail of the plurality of rails, respectively.

2. The solar panel racking assembly of claim 1, further comprising a plurality of purlin clamps, wherein each purlin clamp of the plurality of purlin clamps comprises:
    a hook portion configured to engage an upper flange of a purlin of the plurality of purlins; and
    an arm portion configured to couple to a side of a rail of the plurality of rails.

3. The solar panel racking assembly of claim 2, wherein a side of at least one rail of the plurality of rails comprises a channel, and wherein the arm portion of one purlin clamp of the plurality of purlin clamps is configured to couple to the channel with a channel nut and bolt.

4. The solar panel racking assembly of claim 1, further comprising a plurality of ground rail purlin clamps, wherein:
    a first end of each ground rail purlin clamp of the plurality of ground rail purlin clamps is configured to engage an upper flange of a purlin of the plurality of purlins;
    a second end of each ground rail purlin clamp of the plurality of ground rail purlin clamps is configured to rest against and provide support for a rail of the plurality of rails; and
    each ground rail purlin clamp is further configured to couple to a side of a rail of the plurality of rails.

5. A solar panel racking assembly, comprising:
    a plurality of posts;
    a plurality of purlins coupled to the plurality of posts, each one of the at least one purlin of the plurality of purlins including a lower flange having horizontal and upwardly-bent edge portions with upper and lower surfaces;
    a plurality of rails coupled to the plurality of purlins;
    a plurality of solar modules coupled to the plurality of rails; and
    a plurality of purlin braces, each one of the plurality of purlin braces having first and second ends, wherein the first end of at least one of the plurality of braces is placed below the lower surface of the horizontal portion, wherein the first and second ends of at least one purlin brace of the plurality of purlin braces couple the horizontal portion of the lower flange and a rail of the plurality of rails, respectively.

6. The solar panel racking assembly of claim 5, further comprising a plurality of ground rail purlin clamps, wherein:
    a first end of each ground rail purlin clamp of the plurality of ground rail purlin clamps is configured to engage an upper flange of a purlin of the plurality of purlins;
    a second end of each ground rail purlin clamp of the plurality of ground rail purlin clamps is configured to rest against and provide support for a rail of the plurality of rails; and
    each ground rail purlin clamp is further configured to couple to a side of a rail of the plurality of rails.

7. The solar panel racking assembly of claim 6, wherein a side of at least one rail of the plurality of rails comprises a channel, and wherein one ground rail purlin clamp of the plurality of ground rail purlin clamps is configured to couple to the channel with a channel nut and a bolt.

8. The solar panel racking assembly of claim 5, wherein the at least one purlin brace of the plurality of purlin braces couples the horizontal portion of the lower flange to a rail of the plurality of rails at a point between two consecutive posts of the plurality of posts.

9. A solar panel racking assembly, comprising:
    a plurality of posts;
    a plurality of purlins coupled to the plurality of posts, each one of the at least one purlin of the plurality of purlins including a lower flange having an upwardly-bent edge portion with upper and lower surfaces;
    a plurality of rails coupled to the plurality of purlins;
    a plurality of solar modules coupled to the plurality of rails; and
    a plurality of purlin braces, each one of the plurality of purlin braces having first and second ends, wherein the first end of at least one of the plurality of braces is configured with a clamp placed above and below the upper and lower surfaces, respectively, and wherein the first and second ends of at least one purlin brace of the plurality of purlin braces couple the upwardly-bent edge portion of the lower flange to a rail of the plurality of rails, respectively.

10. The solar panel racking assembly of claim 9, wherein the plurality of purlins comprises zee-purlins.

11. The solar panel racking assembly of claim 9, wherein the plurality of posts comprises at least one of;
    4"×4" posts;
    cee-purlins; and
    6"×9" posts.

12. The solar panel racking assembly of claim 9, wherein the plurality of posts is set within at least one of:
    soil;
    concrete piers;
    grade beams; and
    ballast blocks.

13. The solar panel racking assembly of claim 9, further comprising a plurality of ground rail purlin clamps.

14. The solar panel racking assembly of claim 13, wherein:
    a first end of each ground rail purlin clamp of the plurality of ground rail purlin clamps is configured to engage an upper flange of a purlin of the plurality of purlins;
    a second end of each ground rail purlin clamp of the plurality of ground rail purlin clamps is configured to rest against and provide support for a rail of the plurality of rails; and
    each ground rail purlin clamp is further configured to couple to a side of a rail of the plurality of rails.

15. The solar panel racking assembly of claim 14, wherein a side of at least one rail of the plurality of rails comprises a channel, and wherein one ground rail purlin clamp of the plurality of ground rail purlin clamps is configured to couple to the channel with a channel nut and a bolt.

16. The solar panel racking assembly of claim 9, wherein consecutive purlins of the plurality purlins are configured to partially overlap in a nesting configuration and are spliced together with at least one fastener.

17. The solar panel racking assembly of claim 9, wherein the at least one purlin brace of the plurality of purlin braces couples the upwardly-bent edge portion of the lower flange to a rail of the plurality of rails at a point between two consecutive posts of the plurality of posts.

18. The solar panel racking assembly of claim 9, further comprising a plurality of purlin clamps, wherein each purlin clamp of the plurality of purlin clamps comprises:
   a hook portion configured to engage an upper flange of a purlin of the plurality of purlins; and
   an arm portion configured to couple to a side of a rail of the plurality of rails.

19. The solar panel racking assembly of claim 18, wherein a side of at least one rail of the plurality of rails comprises a channel, and wherein the arm portion of one purlin clamp of the plurality of purlin clamps is configured to couple to the channel with a channel nut and bolt.

\* \* \* \* \*